(12) United States Patent
Guarraci et al.

(10) Patent No.: US 7,992,198 B2
(45) Date of Patent: Aug. 2, 2011

(54) UNIFIED AUTHENTICATION FOR WEB METHOD PLATFORMS

(75) Inventors: Brian J. Guarraci, Redmond, WA (US); Christopher C. White, Seattle, WA (US); Niels Thomas Ferguson, Redmond, WA (US); Jeffrey Dick Jones, Woodinville, WA (US); Sean Patrick Nolan, Bellevue, WA (US); Johnson T. Apacible, Mercer Island, WA (US); Vijay Varadan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 751 days.

(21) Appl. No.: 11/855,364

(22) Filed: Sep. 14, 2007

(65) Prior Publication Data

US 2008/0256616 A1 Oct. 16, 2008

Related U.S. Application Data

(60) Provisional application No. 60/911,540, filed on Apr. 13, 2007.

(51) Int. Cl.
- *G06F 7/04* (2006.01)
- *G06F 15/16* (2006.01)
- *G06F 17/30* (2006.01)
- *G06F 21/00* (2006.01)
- *H04L 29/06* (2006.01)
- *H04L 9/32* (2006.01)
- *G06F 15/173* (2006.01)

(52) U.S. Cl. ............... 726/9; 726/7; 713/175; 713/176; 713/181; 713/185

(58) Field of Classification Search .................. 726/4–9; 713/175–176, 182, 185, 179, 181
See application file for complete search history.

(56) References Cited

U.S. PATENT DOCUMENTS

| | | | | |
|---|---|---|---|---|
| 5,339,403 A | * | 8/1994 | Parker ........................ | 711/221 |
| 6,609,198 B1 | * | 8/2003 | Wood et al. .................. | 713/155 |
| 6,668,322 B1 | * | 12/2003 | Wood et al. .................. | 713/182 |
| 6,691,232 B1 | * | 2/2004 | Wood et al. .................. | 726/6 |
| 6,892,307 B1 | * | 5/2005 | Wood et al. .................. | 726/8 |
| 6,944,761 B2 | * | 9/2005 | Wood et al. .................. | 713/155 |
| 7,111,323 B1 | * | 9/2006 | Bhatia et al. ................. | 726/8 |

(Continued)

OTHER PUBLICATIONS

International Search Report and Written Opinion for PCT Application No. PCT/US2008/060159, mailed Aug. 29, 2008, 3 pages.

*Primary Examiner* — Nathan Flynn
*Assistant Examiner* — Carolyn B Kosowski
(74) *Attorney, Agent, or Firm* — Turocy & Watson, LLP

(57) ABSTRACT

An authentication mechanism is provided for a web method platform that allows homogeneous access for different types of clients according to a bootstrapping procedure utilized to establish the session. Different clients can be assigned different levels of trust based in part on the bootstrapping procedure and/or information provided during the procedure. The bootstrapping procedure can produce a token that is used by the clients in subsequent requests to provide previous authentication or state information to the platform. The token can comprise a shared secret used to ensure integrity of communications in some cases, and the token can be opaque to the client. Tokens can expire and require a client to re-bootstrap to provide higher levels of authentication protection, and tokens can be shared among a plurality of application servers to facilitate effective handling of requests in a farmed environment.

17 Claims, 12 Drawing Sheets

U.S. PATENT DOCUMENTS

| | | | |
|---|---|---|---|
| 7,117,359 B2 * | 10/2006 | Wood et al. | 713/155 |
| 7,174,456 B1 * | 2/2007 | Henry et al. | 713/158 |
| 7,185,364 B2 * | 2/2007 | Knouse et al. | 726/8 |
| 7,188,181 B1 * | 3/2007 | Squier et al. | 709/228 |
| 7,197,568 B2 * | 3/2007 | Bourne et al. | 709/229 |
| 7,275,259 B2 * | 9/2007 | Jamieson et al. | 726/8 |
| 7,305,470 B2 * | 12/2007 | Tom et al. | 709/225 |
| 7,392,536 B2 * | 6/2008 | Jamieson et al. | 726/8 |
| 7,412,720 B1 * | 8/2008 | Frey et al. | 726/8 |
| 7,415,607 B2 * | 8/2008 | Sinn | 713/158 |
| 7,428,637 B1 * | 9/2008 | Billman et al. | 713/168 |
| 7,526,485 B2 * | 4/2009 | Hagan et al. | 1/1 |
| 7,784,089 B2 * | 8/2010 | Lundblade et al. | 726/5 |
| 2002/0133719 A1 * | 9/2002 | Westerdal | 713/201 |
| 2002/0169967 A1 * | 11/2002 | Varma et al. | 713/185 |
| 2002/0184507 A1 * | 12/2002 | Makower et al. | 713/182 |
| 2003/0033535 A1 * | 2/2003 | Fisher et al. | 713/185 |
| 2004/0064693 A1 | 4/2004 | Pabla et al. | |
| 2005/0010780 A1 * | 1/2005 | Kane et al. | 713/182 |
| 2005/0071677 A1 | 3/2005 | Khanna et al. | |
| 2005/0204148 A1 * | 9/2005 | Mayo et al. | 713/185 |
| 2006/0182280 A1 | 8/2006 | Laitinen et al. | |
| 2006/0206932 A1 | 9/2006 | Chong | |
| 2007/0016653 A1 * | 1/2007 | Larsen et al. | 709/217 |
| 2007/0157297 A1 * | 7/2007 | Patrick | 726/6 |
| 2008/0072300 A1 * | 3/2008 | Garbow et al. | 726/8 |
| 2009/0064300 A1 * | 3/2009 | Bagepalli et al. | 726/7 |

* cited by examiner

UNIFIED AUTHENTICATION FOR WEB METHOD PLATFORMS

CROSS-REFERENCE TO RELATED APPLICATION(S)

This application claims the benefit of U.S. Provisional Patent Application Ser. No. 60/911,540 filed on Apr. 13, 2007, entitled "UNIFIED AUTHENTICATION MODEL," the entirety of which is incorporated herein by reference.

BACKGROUND

The evolution of computers and networking technologies from high-cost, low performance data processing systems to low cost, high-performance communication, problem solving, and entertainment systems has provided a cost-effective and time saving means to lessen the burden of performing every day tasks such as correspondence, bill paying, shopping, budgeting information and gathering, etc. For example, a computing system interfaced to the Internet, by way of wire or wireless technology, can provide a user with a channel for nearly instantaneous access to a wealth of information from a repository of web sites and servers located around the world. Such a system, as well, allows a user to not only gather information, but also to provide information to disparate sources. As such, online data storing and management has become increasingly popular.

Financial information systems and the like provide access to sensitive data, which can be convenient for a user; however, strong security with respect to such systems is desired so the information can remain protected. To this end, developers of these systems are increasingly implementing more secure associations between users and their credentials or the platform being accessed. In an open online environment, such as the World Wide Web, packet sniffing and other communication compromising techniques are fairly simple requiring increased security methods and credentials. Many systems have started adding avatars or other verification questions/facts that a user must appropriately select or answer in addition to providing a user name and password. Additionally, tokens can be used in such systems and can comprise a plurality of data fields that are typically encrypted. The tokens, as well as the encryption/decryption algorithms, can be of increasing complexity and must be encrypted and decrypted at least at the system node. Moreover, protocols for accessing the systems are becoming more secure, requiring greater processing power which can slow access. The trends in security are moving toward the more secure association of users and platform by requiring more secure passwords, additional information beyond user name and password, better encryption algorithms for the credentials, and the like.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

An authentication mechanism for a web method platform is described that allows homogeneous access to one or more web methods in the platform after bootstrapping an authenticated session with a client. The bootstrapping procedures can vary from client to client, such as based on type of the client and/or a user connected thereto. Depending on the bootstrapping procedure and/or other factors, trust-tier levels can be assigned to the client(s) that can be used to control subsequent access to the one or more methods. In this regard, a sense of application can be added to the authentication procedure such that some application configurations (e.g. application server) can be trusted more than others (e.g. thick-client application). Additionally, upon bootstrapping the authenticated session, such as by providing and validating credentials, a token can be generated for and sent to the client to be provided in subsequent requests. Thus, state information can be passed with requests for web method access in a substantially stateless configuration.

In one embodiment, the token can comprise a shared secret sent to the platform upon request to establish the authenticated session. The platform can put the shared secret in the token to receive along with the subsequent requests, mitigating the need to store information regarding the client and/or user. In this regard, once an application is authenticated along with the user utilizing the application, the shared secret can be used to create a message authentication code (MAC) with each request, which can be quickly validated and is more efficient than continually encrypting and decrypting entire requests. For example, the shared secret can be a message authentication code key that can be applied to a request; the resulting code can be sent along with the request. When the request is received, the platform can access the token and message authentication code key (e.g. a shared secret, and/or MAC algorithm) stored in the token. Applying the key to the message, the platform can compare the result to the result computed at the client end and sent along with the request. If the results do not match, this can indicate that the request was tampered with en-route. To this end, the authentication mechanism can be more efficient than other mechanisms by using the MAC/shared secret validation. Additionally, adding the application aspect to the authentication mechanisms provides for establishment of different trust levels depending at least in part on the application configuration (and/or a user requesting access, for example). This provides additional security in some configurations while providing more trust to others, such as application server configurations, for example.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
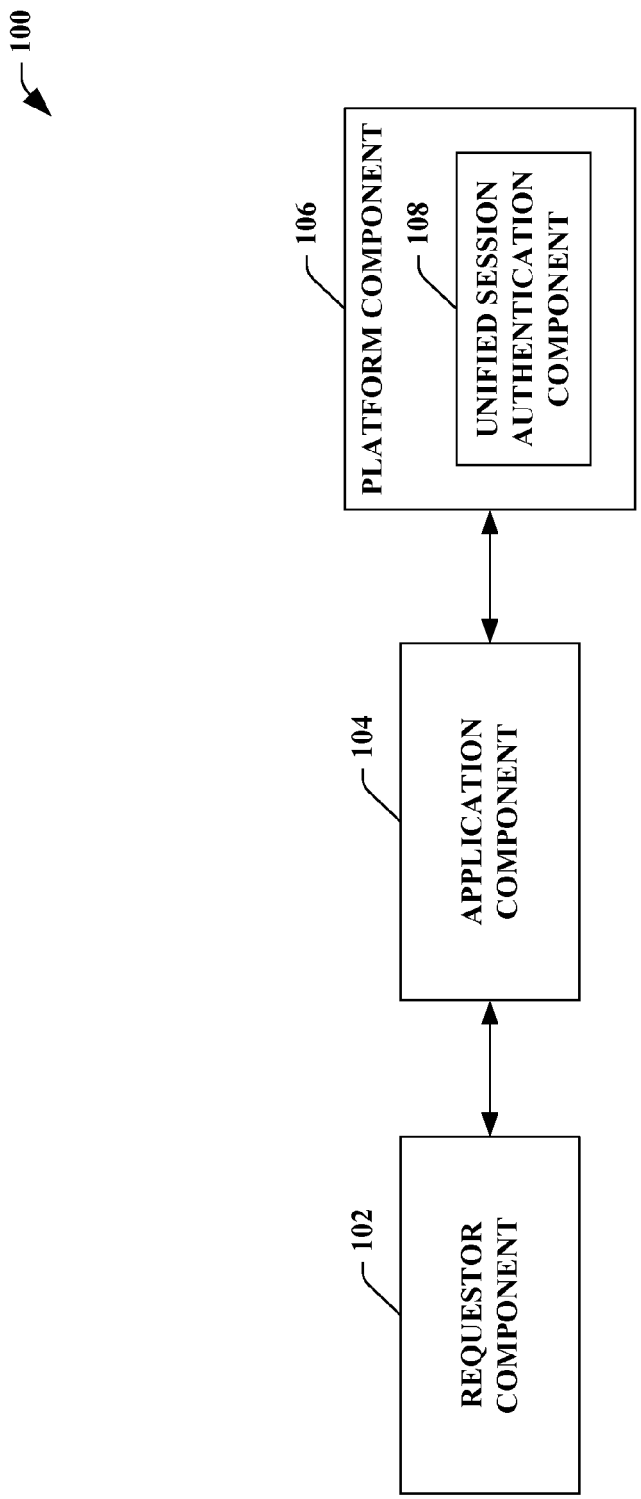
FIG. 1 illustrates a block diagram of an exemplary system that provides platform access to one or more applications.

An authentication mechanism for a web method platform is provided that allows multiple applications of disparate type and location to access platform methods and data based at least in part on a credential relating to a requesting entity; the application(s) can request the data and/or methods on behalf of the requesting entity, for example. The platform can be, for example, one comprising sensitive data for which effective security and/or varying levels of security is desired. For example, the platform can distribute financial and/or health related data, which can be especially sensitive, other data that is not as sensitive, such as gaming/competitive data, and/or substantially any data/method(s) for which some level of protection is desired. The applications can implement disparate bootstrapping sequences with the platform to initiate a session; once the session is initialized, subsequent requests can be authenticated in a homogeneous manner while ensuring integrity and authenticity of requests. Additionally, the platform can approve/deny requests and/or return data based at least in part on a classification of a requesting application and/or entity. For example, the application can be thick-client application or an application server. The platform can prefer one application classification to the other in granting requests based in part on a security risk associated with the application type, for example. In one aspect, application and user authentication are considered as separate concepts and presented by different mechanisms to facilitate ensuring authenticity on multiple levels to provide more secure access to the platform. Other levels of security (such as per device, etc.) can be added as well.

In one embodiment, the application can be an application server, for example, that provides remote access of platform data and/or a value added to the data to one or more requesting entities (such as a user, for example). A session can be initiated with the platform by a bootstrapping sequence that can verify credentials related to the user and the platform, for example, as well as trust and verification mechanisms between the application and the platform. Once the bootstrapping sequence is complete, the session can be established and communication can persist between the application and the platform on behalf of the user. To this end, a state can also be maintained in this otherwise stateless configuration by providing one or more tokens (which can have limited life) along with the requests from the application to the platform, for example. In a similar manner, the application can also be a thick-client application with a disparate bootstrapping sequence. Additionally, based on the application and/or the bootstrapping sequence, for example, the platform can assign a trust-tier level to each application, which can affect subsequent decisions regarding data access. It is to be appreciated that applications operable with the platform are not limited to the foregoing, rather these are examples of such applications used to facilitate discussion.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Now turning to the figures, FIG. 1 illustrates a system 100 that provides a unified authentication model for establishing a platform session. A requestor component 102 is provided that represents a requesting entity desiring access to one or more methods or data. An application component 104 is also provided to facilitate accessing the desired method/data from a platform component 106. The platform component has a unified session authentication component 108 for establishing a session with the application component 104 (on behalf of the requestor component 102, for example) to provide the desired data and/or method access to the platform component 106. In one embodiment, the requester component 102 requests data from the application component 104, and the application component 104 establishes a session with the platform component 106 (via the unified session authentication component 108, for example). Once the session is established, the application component 104 accesses one or more web methods exposed from the platform component 106 to formulate a response to the request from the requester component 102.

The application component 104 can be of many types; thus, the application component 104 can be required to execute an application specific bootstrapping sequence with the platform component 106 to facilitate operation with the unified session authentication component 108. The bootstrapping sequence, for example, can be required for each initial communication from the application component 104 to the platform component 106 on behalf of a given requester component 102, for example. Data exchanged in the bootstrapping sequence can be used in subsequent requests to the platform component 106 to authenticate the application component 104 (alone and/or in combination with the requester component 102) by utilizing the unified session authentication component 108, for example. This information can be a shared secret, for example, which can be subsequently used to evaluate messages with respect to a MAC. In this regard, the otherwise stateless configuration of the embodiment (which can be a request/response type of configuration, for example) can attain a state by leveraging session data exchanged during the bootstrapping sequence. For additional security, this data exchanged during the bootstrapping sequence can have an expiration time to prevent hacking of the data over time. After the expired time, the platform component 106 can require the application component 104 to execute the bootstrapping sequence again. Additionally, the platform component 106 can differentiate between disparate types of application components 104 and requester components 102 to provide tier-based authentication/authorization for given configurations, for example.

In one embodiment, the application component 104 can be a thick-client application, for example, that is local to the requestor component 102. The thick-client application can directly communicate with the platform component 106 for accessing methods and data on the platform component 106. In this embodiment, the requester component 102 can be, for example, a user directly utilizing the thick-client application and/or a web browser on the thick-client application machine that can leverage the thick-client application and is operated by a user or other entity. In another embodiment, the application component 104 can be, for example, one or more application servers (and in fact an application server farm operating with a load balancer in one embodiment). The requester component 102, in this embodiment, can be a remotely located web browser and\or a user operating the web browser, for example. Additionally, the requester component 102 can be substantially any application or entity that can communicate with the application component 104. Due to the numerous configurations, the platform component 106 can desire to provide access based in part on the configuration. This can be accomplished, for example, by utilizing a tier-based approach. In the foregoing embodiments, for example, the platform component 106 can offer more verbose access to an application server model having an authenticated user than to a thick-client application having an anonymous user, for example, since the former can be a more trusted configuration.

The platform component 106 can relate to many kinds of data and/or accessing methods, etc. In one embodiment, data can be extremely sensitive such that maximum protection is desired (for example, financial and/or health related data). To this end, the data/methods can even have associated external data regulation entities that require certain standards for data protection, such as the Health Information Portability and Accountability Act (HIPAA) for health data, for example. Thus, security measures can be more than just desired, but also required in some cases. To this end, the subject matter as described can specify varying levels of access to data in the platform component 106 depending on many factors, including but not limited to the type of the application component 104. In this regard, an application server configuration can be trusted more than a thick-client application configuration, for example, due to the locality of the application components 104 with respect to the requester components 102 (which can directly access the platform component 106). Thus, since the thick-client application typically runs local to, or not far from, the requestor component 102, direct tampering is more of an issue than when utilizing an application server, which is typically remotely located and secured. Moreover, the application server configuration can physically protect a certificate having a private key that can be used to identify the application server. In this regard, application server configurations can sign requests using the private key and the platform component 106 can have a corresponding public key to validate the request. In a thick-client application configuration, any installed certificate can be subject to use by other applications on the thick-client machine; thus, authenticity of the request cannot be guaranteed in an application context in some cases as with the application server configuration. Additionally, it is to be appreciated that other types of data and methods can be protected as well by the subject matter as described, and varying levels of security can also apply based in part on the type of data and/or application configuration as described previously. In this regard, many combinations of security schemes can be defined and utilized for many different configurations of the platform component 106 and its stored data. In this regard, methods and data sought to be protected by the platform component 106 can include those to store and/or retrieve financial account information, such as overviews, balances, beneficiaries, transaction histories, etc., health information, such as medical history, assessment information, workout regimens, diet and nutrition information, family history, etc., and substantially any kind of information in substantially any context that can be stored by a platform.

Figure 2:
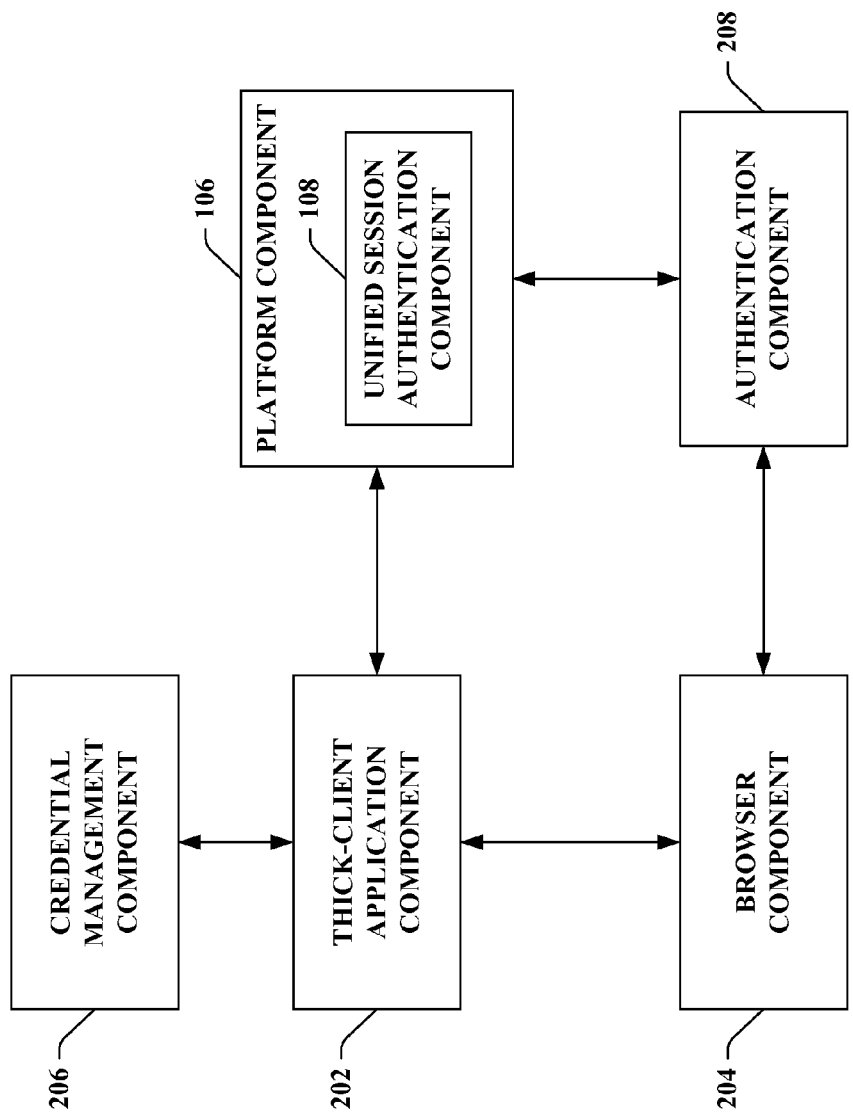
FIG. 2 illustrates a block diagram of an exemplary system that provides platform access to one or more thick-client applications.

Referring to FIG. 2, a system 200 for providing access to a platform via an authenticated session is shown. In particular, a thick-client application component 202 is provided that accesses a platform component 106 for methods and/or data associated therewith. The platform component 106 comprises a unified session authentication component 108 that provides authenticated sessions to one or more apps, which can be of disparate types. Additionally, a browser component 204 is provided to request the data from the thick-client application component 202. A credential management component 206 is also shown to facilitate separating user authentication from application authentication in this configuration, and an authentication component 208 is provided to ensure initial authentication of a credential related to the browser component 204 and/or an entity utilizing the browser component 204 (such as a user, for example).

In one embodiment, the thick-client application component 202 can operate within the browser component 204 (as a control, for example). Additionally, however, the browser component 204 can access the thick-client application component 202 from a disparate process and/or location. The browser component 204 can be operated by a user, for example, desiring access to data from the platform component 106; the desired access can be in the form of the raw data as stored in the platform component 106 and/or by way of one or more web methods offered from the platform component 106 or the thick-client application component 202. In this embodiment, the credential management component 206 can provide external user identification functionality that can be accessible by the thick-client application component 202 and the platform component 106 such that neither is responsible for implementing user profile management functionality. Additionally, however, the thick-client application component 202 can implement the credential management component 206 and provide access to the platform component 106.

Upon receiving a request for data from a user, the browser component 204 can require the user to provide login information (such as one or more credentials). Additionally, the browser component 204 can forward the information to the thick-client application component 202, which may require the login information and can prompt the browser component 204 for such. In either embodiment, the user can provide credentials to the browser component 204; the credentials can relate directly to the credential management component 206, for example. In one embodiment, the credentials can relate to the user selecting a profile or other identification from the credential management component 206 via the thick-client application component 202 and/or the browser component 204, for example. Upon receiving the credentials, the thick-client application component 202 or the browser component 204 can begin the bootstrapping sequence by subsequently providing the credentials to the authentication component 208 to initially authenticate the browser component 204 (or a user thereof, for example) against the platform component 106. The authentication component 208 can act as a shell and leverage the platform component 106 to authenticate the credential with respect to the platform component 106 (such as against profile information stored on the platform component 106). It is to be appreciated that the authentication component 208 can be managed by a partner or other entity that can be a third-party to the platform component 106, for example. Additionally, the platform component 106 can utilize the credential management component 206 (which can be centralized and remotely accessible) to check the authenticity of the provided credential. If the credential is valid, the platform component 106 and/or the unified session authentication component 108 can create a session token for subsequent requests by the thick-client application 202 on behalf of the browser component 204 or the user/entity associated therewith. This can end the bootstrapping sequence, for example, and allow the homogeneous authenticated session protocol to be subsequently utilized.

The session token can be sent back to the thick-client application component 202 for subsequent communication to implement the homogeneous authenticated session. The created session token can indicate the opening of a session between the platform component 106 and the thick-client application component 202, for example. In one embodiment, the session token can be of no importance to the thick-client application component 202 other than to send in subsequent requests in the form received by the platform component 106. It is to be appreciated that the session token can provide a state to the requests made from the thick-client application component 202 to the platform component 106. In one embodiment, the session token can have a format substantially similar to the following:

| Datum | Size (bits) |
| --- | --- |
| EnvelopeHeader | 32 |
| IV (plaintext) | 128 |
| DataHeader | 32 |
| USERID | 128 |
| APPID | 128 |
| Expire DateTime | 128 |
| Shared Symmetric Key | 128-256 |
| Padding | 1-128 |
| HMACSHA256 | 256 |
| SUM | 1088-1216 |

In this embodiment, the EnvelopeHeader can be broken down into a version and/or key index, for example, IV can represent a randomly generated initialization vector, and the data header can also be broken down into a version and/or shared symmetric key length, for example, etc. In this embodiment, fields other than the HMACSHA256 can be applied with a MAC algorithm (such as an HMACSHA1 with a 256-byte key, for example), for example.

Upon sending the subsequent requests for method access and/or data, the thick-client application component 202 can package the requests with the session token to maintain state with the platform component 106, for example. Upon receiving a request, the platform component 106 can pass the request and/or the token portion of the request to the unified session authentication component 108 to ensure the session is valid (and/or not expired, for example). In one embodiment, the token can comprise a shared secret (such as a MAC algorithm and/or proof key) to verify the message sent by the thick-client application component 202. This can ensure the message was not tampered with en-route. For example, the shared secret and/or an applicable MAC algorithm can have been sent to the platform component 106/unified session authentication component 108 during the bootstrap sequence. In one embodiment, the session token (and/or a portion thereof, such as the MAC algorithm and/or the shared secret) can expire requiring the bootstrapping sequence to be re-executed, for example.

In one embodiment, the platform component 106 can expose a plurality of web services for access by an application. The thick-client application component 202 can operate in conjunction with a web browser (which can be the browser component 204, for example) to access the web services on behalf of a user accessing the browser. Moreover, however, the browser component 204 can be a generic interface that exposes functionalities available by utilizing the thick-client application component 202, for example. The web services can be exposed and accessed directly for the user and/or to aggregate data to fulfill a request, for example. Upon an initial request from a user to the browser component 204, a login screen can be displayed to authenticate the user with respect to the credential management component 206. The credential management component 206 can provide a passport functionality, for example, that ensures authenticity of a user by passing an identification related to the credential management component 206, such as a passport. Additionally, the passport can comprise a security assertion markup language (SAML) token that can be passed as part of the passport or as the identification by the credential management component 206, for example. Once authenticated, the thick-client application component 202 can pass the passport or other identification to the authentication component 208. mitigating direct access to the platform component 106 for this configuration. The authentication component 208 can, for example, enforce validity checking on the passport and/or forward the authentication request to the platform component 106, for example. The platform component 106 can extract information from the request, such as a token and/or a shared secret (such as a decryption/signing algorithm and/or a proof key therefor) for subsequent requests, for example. The platform component 106 can ensure that the passport is allowed to open a session with the platform component (alone and/or in conjunction with the thick-client application component 202, for example) and create a session token if this is the case. Included in the session token can be information for the platform component 106 to utilize in subsequent requests. One such piece of information can be the shared secret to check validity of subsequent requests. In one embodiment, a keyed-hash message authentication code (HMAC) can be used to implement this functionality where the algorithm can be a secure hash algorithm (SHA) and/or a variation thereof, and the proof key can be used by the algorithm to render an HMAC for a given request.

The session token can be sent to the thick-client application component 202 to utilize in the subsequent requests. A successful login can be specified to the user, and the user can begin to utilize the browser component 204 (such as a generic interface or a web browser, as described above) to access platform methods and data; the browser component 204 can leverage the thick-client application component 202 to achieve such access, for example. It is to be appreciated that the thick-client application component 202 can access the methods and data of the platform component 106, on behalf of the browser component 204 or a user thereof, in many ways, including via a software development kit (SDK), an exposed application program interface (API), a browser that can call methods of the platform component 106, and/or the like. Subsequent requests can be made from the user to the thick-client application component 202 via the browser component 204, and the thick-client application component 202 can formulate a request to the platform component 106 incorporating the session token in the request. Additionally, the thick-client application component 202 can apply a MAC algorithm to the request by using the earlier supplied shared secret to create a MAC (such as an HMAC, for example) to indicate an application identity associated with the request. The platform component 106 can forward the request, or a portion thereof, to the unified session authentication component 108 to validate the session before responding to the request. In one embodiment, the request can specify a MAC that can be checked by the unified session authentication component 108 by creating a MAC using the shared secret initially specified in the bootstrapping sequence. As described, this shared secret can have been placed in the session token for subsequent usage by the platform component 106. In this regard, the thick-client application component 202 can manage the shared secret (and the life thereof), thus, decoupling the shared secret from the platform component 106. If the MAC computed by the unified session authentication component 108 utilizing the shared secret does not match that sent with the request, the request can be considered compromised and the platform component 106 can refuse to fulfill the request, for example. If the message has not been compromised, the unified session authentication component 108 can ensure the passport and other information in the session token is valid (and/or not expired, for example). It is to be appreciated that trust-tiers can be created corresponding to a thick-client application with anonymous login and a thick-client application with a valid platform user login. In one embodiment, these can be respectively identified as Tier 0 and Tier 2 in a 4-part trust-tier model (tiers 1 and 3 are explained below).

Figure 3:
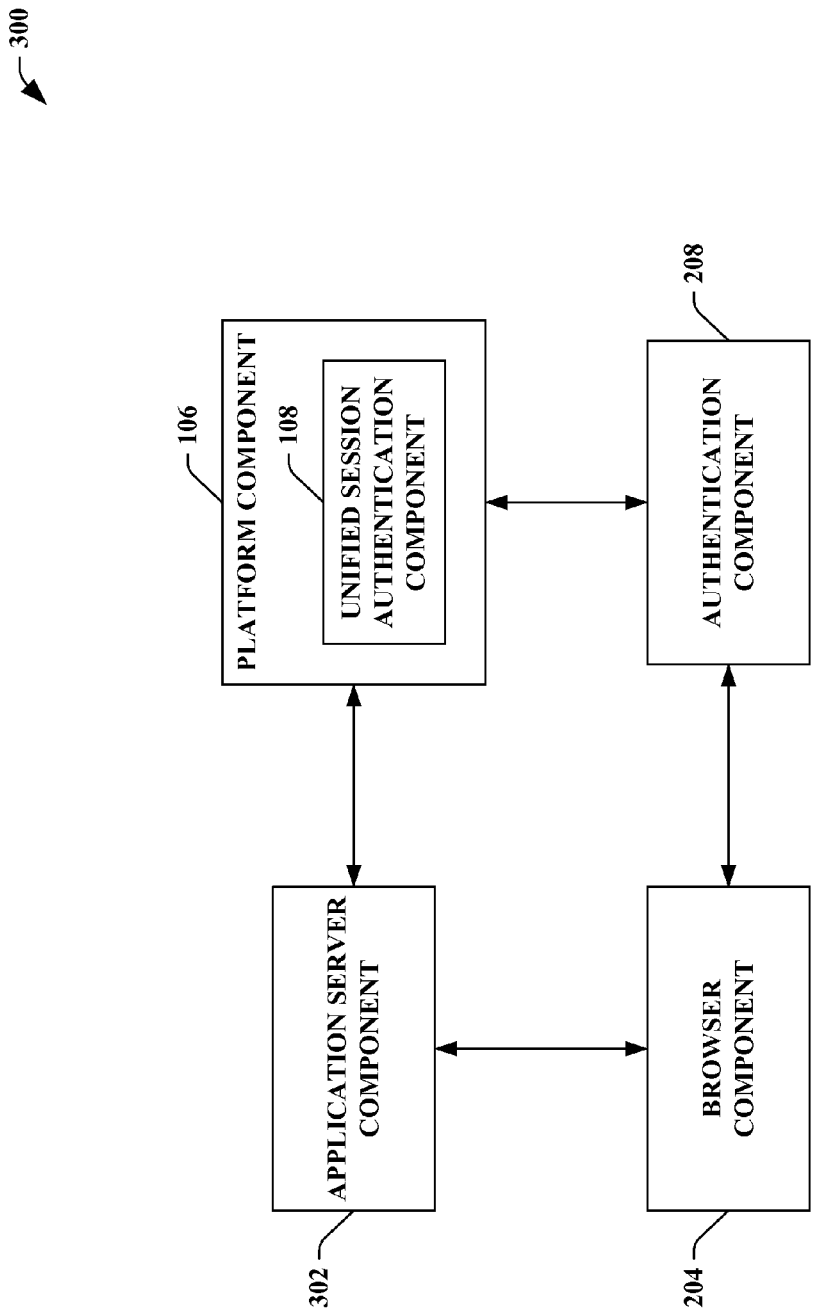
FIG. 3 illustrates a block diagram of an exemplary system that provides platform access to one or more application servers.

Turning now to FIG. 3, a system 300 for providing a platform session to one or more applications is displayed. An application server component 302 is provided to facilitate accessing methods and/or data from a platform component 106 on behalf of a browser component 204 and/or a user associated therewith. The platform component 106 additionally comprises a unified session authentication component 108 that creates a session with the application server component 302 for subsequent data/method access. Additionally, an authentication component 208 is provided to forward an authentication request to the platform component 106 on behalf of the browser component 204 or a user utilizing such, for example. In one embodiment, a session is bootstrapped according to the application server component 302 by authenticating through the authentication component 208 such that subsequent accessing of the platform component 106 (and/or methods/data associated therewith) is done in a homogeneous manner for one or more disparate applications as described supra.

In one embodiment, the application server component 302 can be a single entity (such as a server) or a plurality of similarly implemented entities—for example, the similarly implemented entities can be load-balanced. It is to be appreciated that such an environment can be more strongly tied to the platform component 106 such that it is trusted more than the previous configuration for various reasons (such as because the servers are typically isolated from users, the investment made by the owner of the servers can be significant, application servers are not installed on client machines, and the like for example). Thus, the bootstrapping procedure can be somewhat different in light of this trust. As will be described in reference to the trust-tier based architecture, this can result in greater functionality for these trusted application server components 302. It is to be appreciated, however, that the trust-tier based architecture is not limited to the two configurations or determination of trust levels (or tiers); rather, many other configurations can exist and be trusted at the same or different levels, for example. Thus, decisions regarding accessing methods (such as web methods or web services) and data in the platform component 106 can be made based in part on the trust level (or tier).

In one embodiment, the browser component 204 can be directed to the application server component 302 (automatically and/or by a user, for example) to request data from the platform 106 and/or value-added data offered by the application server component 302 that is formulated from one or more methods calls to the platform 106. The application server component 302 can be required to login on behalf of the user and/or browser component 204 to facilitate accessing such methods and/or data. To achieve this, the application server component 302 can, for example, redirect the browser component 204 to the authentication component 208 to authenticate the browser component 204 and/or a user/accessing entity thereof to begin the bootstrapping sequence. In this embodiment, the authentication component 208 can act as a gateway to the platform component 106 for various features, such as preliminary investigation of the login request to prevent malicious attempts and to take processing burden form the platform component 106. To this end, the authentication component 208 can act as a shell (and can be a disparate web method or service, for example) that communicates with the platform component 106 to authenticate the user and receive a session token created by the platform component 106 to submit back to the application server component 302, for example. In one embodiment, the session token can comprise information provided in the request that the platform component 106 can use in subsequent requests to retain a state associated with the application server component 302, the browser component 204, and/or a user or entity associated therewith, for example. Additionally, the session token can be opaque, or of no value, to the application server component 302 other than to submit in one or more subsequent requests. As described, also, the session token can have a limited life to facilitate secure accessing of the platform component 106, for example.

The session token can be generated and sent to the authentication component 208, for example, and the authentication component 208 can transmit the session token back to the application server component 302 for subsequent requesting. Upon the occurrence of a subsequent request on behalf of the browser component 204 triggered by a user or accessing entity (and/or in response to a request that initially triggered the boot strapping sequence, for example), the application server component 302 can formulate a request to the platform component 106. The request can comprise, for example, the session token as well as relevant desired method calls (such as for web methods or web services in one embodiment) and/or desired data from the platform component 106. The application server component 302 can sign the request with a private encryption key to prove its identity to the platform component 106 on subsequent request. To facilitate this end, the application server component 302 can have registered with the platform component 106 at an earlier time providing it with a public key to decrypt its envelope. Because this configuration can be more trusted than the thick-client configuration, for example, the platform component 106 can accept the public key upon registration with little risk, for example. Using this public key, the platform component 106 (or the unified session authentication component 108, for example) can decrypt the envelope using the key; if the decryption is successful, session establishment can continue. If decryption fails, the request can be dropped and/or an error reported, etc.

Once the request is decrypted, for example, the unified session authentication component 108 can authorize the session; this can include authenticating the user and/or ensuring credentials are still up to date, etc. After authorizing the session, and responding to a method/data request if present, the platform component 106 can communicate the authorization to the application server component 302, for example. This can complete the bootstrapping sequence and session communication can occur in a homogeneous fashion (e.g. in substantially the same manner as with the thick-client application after the bootstrapping sequence described supra). Subsequent requests can simply have a shared secret/MAC algorithm applied for validation instead of using the private key to encrypt since the application has been identified, for example. Using a MAC can be more efficient than requiring encryption and/or decryption for each request and since the platform component 106 knows the application server component 302 is authorized, it can trust requests sent by the application. However, the subject matter as described is not so limited; rather encryption and decryption for subsequent requests can be utilized for additional security, for example. Similar to the thick-client application configuration, the shared secret and/or MAC algorithm can be sent to the authentication component 208 upon initial authentication (or bootstrap sequence, for example) and forwarded on to the platform component 106. The platform component (and/or the unified session authentication component) can integrate the MAC algorithm and/or shared secret into the session token. In this regard, the application server component 302 sends the MAC algorithm and/or shared secret with each request as part of the token whether or not it is aware of such. The platform component 106 (or unified session authentication component 108, for example) can utilize the shared secret/MAC algorithm to compare subsequent requests sent by the application server component 302 with those received to ensure the request was not tampered with en-route, for example. In one embodiment, the shared secret can be utilized in creating an HMAC, for example. In one embodiment, an HMAC algorithm can be applied to requests, by keying on the shared secret, upon being sent from the application server component 302 to the platform component 106. The unified session authentication component 108 can apply the HMAC algorithm with the shared secret in the session token to the request and compare it with the applied HMAC sent. If they differ, this can be an indication of tampering and the request can be dropped and/or an error reported, etc. It is to be appreciated that the session token and/or the shared secret and/or MAC algorithm can expire. These can expire with one another or separately, and expiration can require a new bootstrapping sequence to occur to continue communication between the application server component 302 and the platform component 106, for example. Using MACs can provide a more efficient configuration as it is an effective method by which to ensure integrity of a request and much faster than encryption/decryption. Again, however, where security is of more concern than expediency, the encryption and/or decryption can be used for some or substantially all requests instead of MACs, for example.

The foregoing configuration can be implemented in a trust-tier architecture as described above. Having an application server with an authenticated user can be assigned a tier 3 level and an anonymous user on the application server can be assigned a tier 1 level. In this trust-tier architecture, 0 can be the least trusted and 3 can be the most trusted. In this regard, the platform component 106 can discriminate against application components (104 in previous figures) based on the trust-tier level. For example, disparate web methods can be offered based on an attained trust-tier level. Additionally, different types of authentication and efficiencies for such can be granted based on the trust-tier level, and the like. Also, it is to be appreciated that more tiers can be implemented with varying levels of privilege and/or different tiers according to different aspects. For example, a device element can be added to the trust-tier architecture. In one example, device A using an application server with an authenticated user can be at the highest tier, followed by device B using an application server with an authenticated user.

Figure 4:
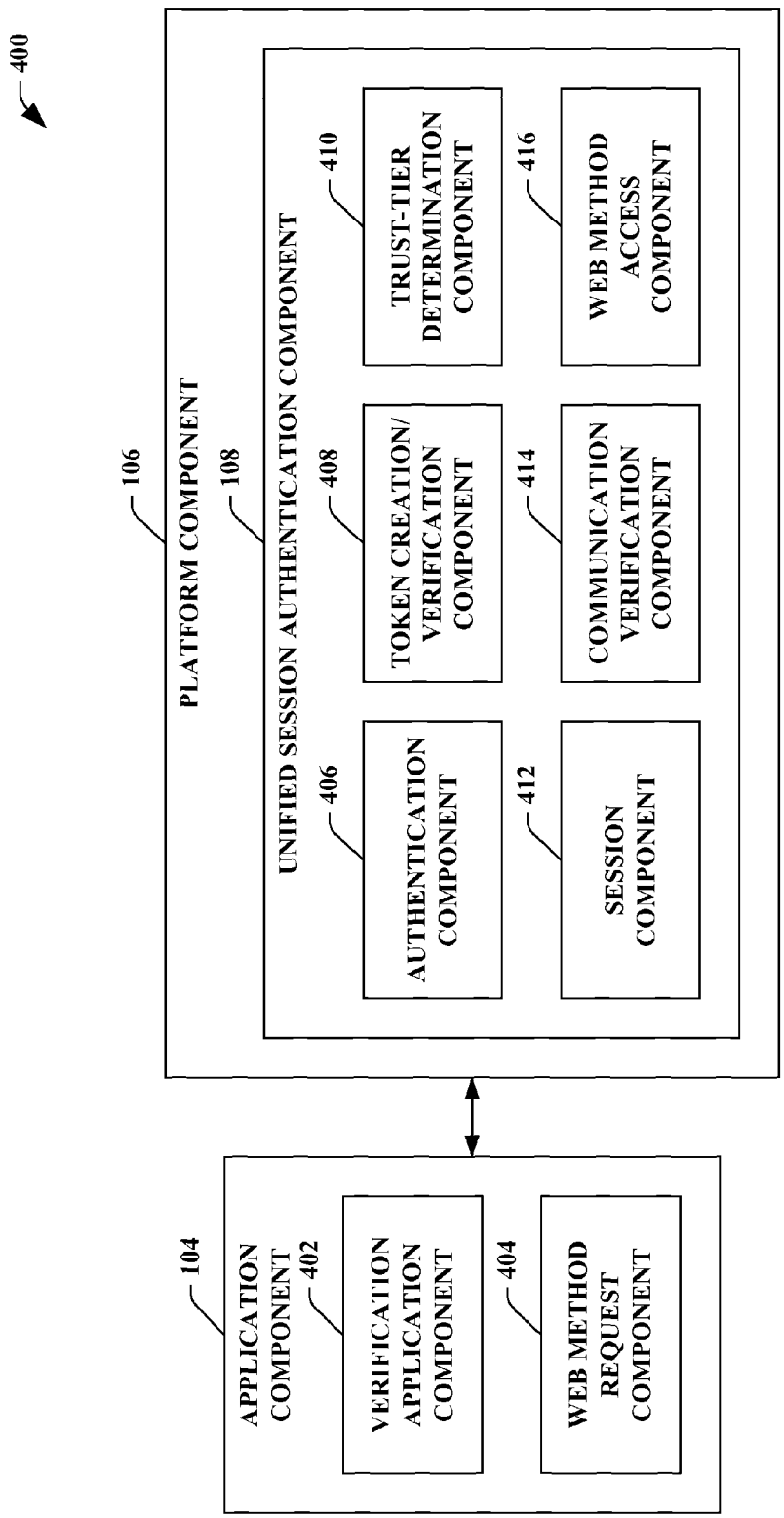
FIG. 4 illustrates a block diagram of an exemplary system that facilitates requesting access to one or more web methods of a platform following a bootstrapping sequence.

Referring now to FIG. 4, a system 400 that facilitates homogeneous session communication with a platform following a bootstrapping sequence is shown. In particular, an application component 104 is provided that requests access to a platform component 106. The application component 104 comprises a verification application component 402 that can provide a verifiable parameter related to one or more requests to the platform component and a web method request component 404 that can request one or more web methods exposed on the platform component 106. The platform component 106 can comprise a unified session authentication component 108 that establishes and maintains a session with the application component 104. The unified session authentication component 108 can comprise an authentication component 406 that can authenticate the application component 104 and/or an associated user, a token creation/verification component 408 that can generate (and verify on subsequent requests) a token in response to an authentication request, the token can be used in subsequent requests by the application component 104, a trust-tier determination component 410 that can assign a trust-tier level to an application component 104, a session component 412 that can create and manage a session with an application component 104, a communication verification component 414 that can ensure a request is sent from the appropriate source, and a web method access component 416 that can provide access to one or more web methods based on a request and/or a trust-tier (or other metric associated with the application component 104), for example.

In one embodiment, the application component 104 has been bootstrapped to the platform component 106 and the unified session authentication component 108 such that an authenticated session has been established and a session token has been returned to the application component 104. The application component 104 can send the session token with subsequent requests to the platform component 106 to provide state information such to indicate the application component 104 has been authenticated and other information regarding the session (such as a shared secret for ensuring validity of requests sent, for example). Upon making a request after bootstrapping (as shown in previous figures), the verification application component 402 can apply a MAC algorithm with the shared secret to the request; the MAC algorithm and/or shared secret can have been provided during the bootstrapping sequence, for example, and inserted as part of the session token. In this regard, the application component 104 can unknowingly send the MAC algorithm and/or shared secret to the platform component 106, for example, in the session token (e.g. the session token can be opaque to the application component 104). Additionally, the web method request component 404 can specify one or more web methods exposed by the platform component 106 for which access or calling is desired. Once the MAC is creating by applying the MAC algorithm to the request, for example, the application component 104 can submit the request to the platform component 106.

The unified session authentication component 108 can receive the request (directly and/or from the platform component 106). Upon receipt, the token creation/verification component 408 can verify the validity of the token according to one or more formats and/or data within. The token creation/verification component 408 can be the original issuer of the session token (and/or the credential token subsequently used to establish the session) when the application component 104 was bootstrapped, for example. Using the shared secret extracted from the token, the communication verification component 414 can apply a MAC algorithm (which can also be in the token in one embodiment) with the shared secret as a key to produce a MAC for the request. The newly created MAC can be compared to that provided by the verification application component 402 to ensure they match. If so, the communication can be valid; if not, this can indicate the message was tampered with while en-route, for example. Moreover, during the bootstrap sequence for an application server, the communication verification component 414 can be utilized to receive a public key relating to an application server and decrypt the initial request for session establishment to determine if the session should be allowed based on the decryption, for example.

Upon verification (or before such), the authentication component 406 can be utilized to ensure the user information provided is correct and/or not expired. Additionally, the authentication component 406 can have been used in the initial bootstrapping sequence of the application component 104 to authenticate a user with respect to the platform component 106, for example. In this regard, the authentication component 406 can be implemented as part of the unified session authentication component 108, the platform component 106, and/or a different external component, for example. The trust-tier determination component 410 can be used to determine a trust-tier level with respect to the application component 104. As described, this can relate to the 4-tier architecture, or substantially any other tier architecture, such that methods can be provided and/or authentication efficiencies depending on the granted level. It is to be appreciated that the level can be determined and stored in the session token, stored at the platform component 106, and/or computed during each request. The session component 412 can comprise session management functionality and/or other state information concerning the session. For example, history, logging, inference based on past activity, and the like can be provided by the session component 412. The web method access component 416 can provide access to one or more web methods associated with the platform component 106. Access can be granted based on trust-tier level and/or credential information with respect to a requesting entity (such as a user, etc.).

Figure 5:
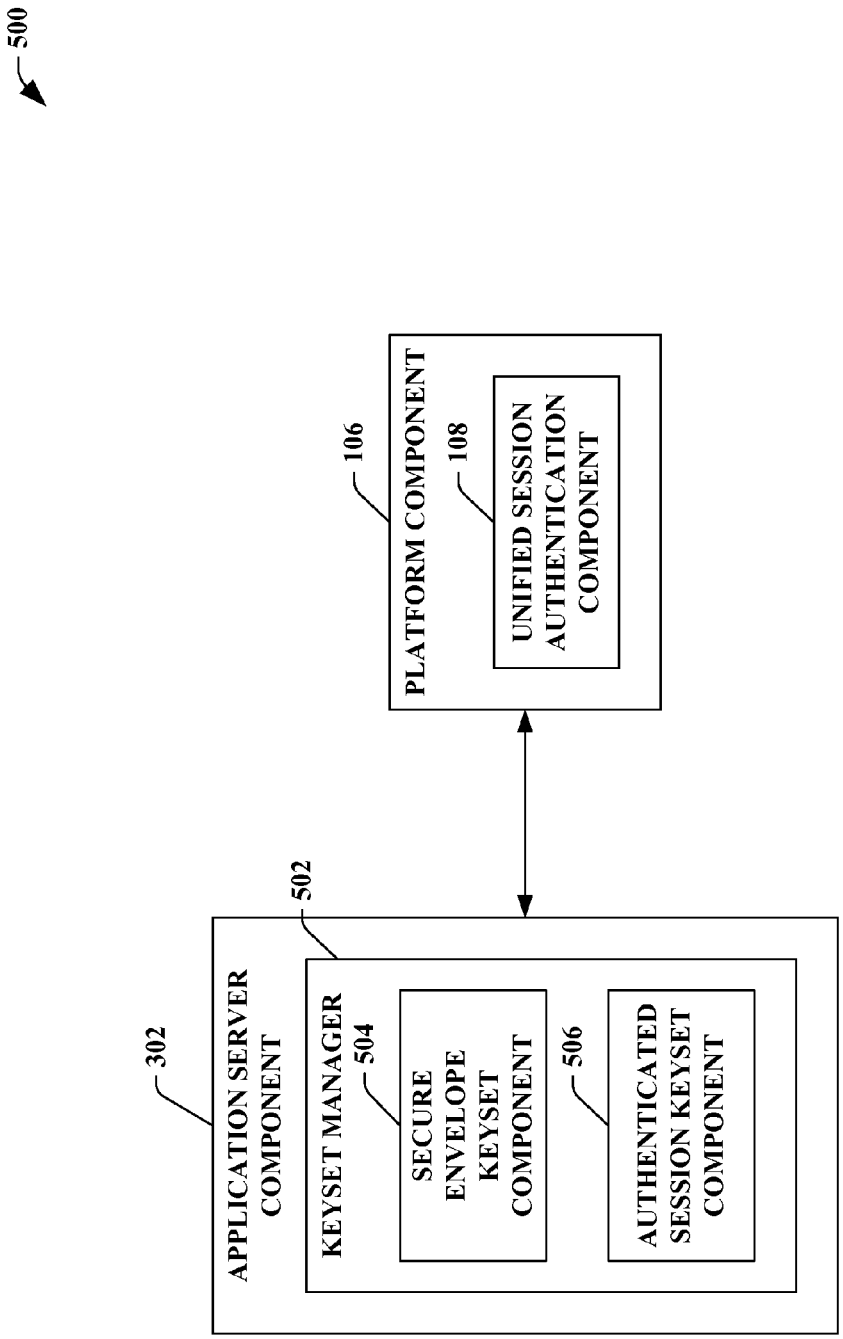
FIG. 5 illustrates a block diagram of an exemplary system that facilitates managing keys on an application server.

Now referring to FIG. 5, a system 500 is displayed that facilitates managing keys for platform communication in an application server (or a server farm comprising one or more application servers, for example). An application server component 302 is provided that establishes a communication session with a platform component 106 and/or a unified session authentication component 108 of such. The application server component 302 comprises a keyset manager 502 to manage a plurality of keys used in communication with the platform component 106. The keyset manager 502 comprises a secure envelope keyset component 504 that manages one or more keys related to establishing a session with the platform component 106 (and/or the unified session authentication component 108) and an authenticated session keyset component 506 that can manage one or more keys associated with providing a message authentication to requests from the application server component 302 before they are sent to the platform component 106.

In one embodiment, the application server component 302 can receive a request for data that requires platform component 106 access from a browser or other entity (such as a user accessing the browser, for example). The application server component 302 can determine if the browser or user has an authenticated session with the platform component 106. If not, the application server component 302 can execute a bootstrapping sequence to establish a session with the platform component 106 on behalf of the browser or user. For example, the user can provide credentials to the application server component 302 that can relate to a profile corresponding to the platform component 106 and/or the unified session authentication component 108, for example.

The application server component 302, as mentioned, can be one in a plurality of application server components 302. The keyset manager 502 provides a mechanism to manage keysets between the plurality of application server components 302. For example, the application server components 302 can be load-balanced such that upon request, from a browser or user for example, one of the plurality of application server components 302 can be chosen to handle the request; the chosen application server component 302 can be different than one previously handling a request for the requesting entity. In this scenario, where an application server component 302 has been validated against the platform component 106 for a given requesting entity, the key can be stored among the plurality of application server components 302 so that each one can access platform component 106 data and methods on behalf of an authenticated requesting entity (such as a user and/or browser) without requiring re-authentication. This can create a more efficient authentication environment for the plurality of application server components 302. The logic, in this regard, can be similar as above where the platform component 106 can trust the application server component 302 configuration more than others as the individual servers are typically kept away from users and often have money and time investments making them a valuable commodity for the owner, for example. In one embodiment, the application server components 302 can have local keyset managers 502 to house the keysets common to the application servers with respect to a requesting entity; the list can be updated as new keys are generated, utilized, and/or rendered inactive, for example. Additionally, the keyset manager(s) 502 can be located in a centralized store and the application server components 302 can access the store when key information is desired, for example.

The secure envelope keyset component 504 can store one or more secured envelope keysets that can be used in an initial bootstrapping sequence, for example, to encrypt a session request. The request can be sent to the platform component 106 and/or a unified session authentication component 108 thereof for decryption. The platform component 106 and/or unified session authentication component 108 can have the key to decrypt the request (and can do so based on an application ID, for example). In one embodiment, the decryption key can be a public key that can be sent to the platform component 106 and/or unified session authentication component 108. Additionally, the key can be obtained by the components, such as upon notification of a request, for example. Also, the encryption key(s) can be a private key such that it is protected and utilized amongst the application server components 302. Thus, the secure envelope keyset component 504 can provide the application server components 302 with one or more private keys to utilize in encrypting a session request envelope, and the platform component 106 and/or unified session authentication component 108 can decrypt the envelope with the public key to ensure the application server component 302 sent the envelope (which can indicate it was not tampered with en-route).

Additionally, the keys can be used within the plurality of application server components 302 to encrypt and decrypt requests or other communications related to a browser and/or user, for example. Moreover, the keys can expire to provide additional security by mitigating chances of compromise. In this regard, the keys of the secure envelope keyset component 504 can be grouped into active and inactive sets, for example. In this embodiment, the active sets can be used to encrypt envelopes, and when a key expires, it can be moved to an inactive set before being expired out of the keyset manager 502. When inactive, the key can be used for decryption, but not necessarily encryption, for example. Additionally, keys can be created by an application server component 302 and requested in conjunction with a request from a user before other application server components 302 have had a chance to update their keyset manager components 502. In this regard, a pre-active status can also be utilized with loading new keysets such that upon creation, the keyset can be loaded into a decryption keyset for the application server components 302 with the pre-active identifier and can be utilized to decrypt packets until the key gets loaded in its general categorical cache, for example.

The authenticated session keyset component 506 can store one or more authenticated session keys or shared secrets that can be used to verify communication between the application server components 302 and the platform component 106. In one embodiment, the application server component 302 can initially utilize private keys, such as those in the secure envelope keyset component 504, to establish a session with the platform component 106. Subsequently, the shared secrets in the authenticated session keyset component 506 can be utilized to facilitate request/response and/or subscription-based communication with the platform component 106. As described, the shared secret can be utilized in applying a MAC algorithm (such as an HMAC algorithm, for example) for requests where the shared secret is sent to the platform component 106 upon an initial communications request from the application server component 302. The platform component 106 (or unified session authentication component 108, for example) can store the shared secret in a session token returned to the application server component 302 during a bootstrapping sequence; the session token is sent with subsequent requests to the platform component 106. The shared secret can be a MAC key from the authenticated session keyset component 506, for example, which can be applied to the subsequent requests. The platform component 106, upon receiving the request, can leverage the unified session authentication component 108 to apply the shared secret in a MAC algorithm to the request to compare the resulting value with one sent with the request. If the values match, this can be an indication that the data was not tampered with en-route. In this regard, the configuration can be stateless as state can be kept in the session token, which is sent to the platform component 106 each request. Thus, the platform component 106 need not store information regarding the requesting entity as it can be provided in each request and validated using the shared secret. This places additional security responsibility with the application server component 302.

The shared secrets stored in the authenticated session keyset component 506 can reside on one or more application server components 302. The shared secrets can have substantially the same lifespan as a session token; to this end, both can expire at substantially the same time. In particular, the shared secret can expire at a given interval or upon occurrence of an event requiring another bootstrapping sequence to be executed. The new bootstrapping sequence can retrieve a new shared secret from the authenticated session keyset component 506 and/or create one and store it in the authenticated session keyset component 506. Using the shared secrets forces an impersonator to have both the session token and the shared secret applied to a request to successfully compromise the request. This can be difficult especially in a multi-step authentication process such as that presented herein thus, creating a more secure environment.

In one embodiment, the keyset manager component 502 can be created by providing an implementation for the following abstract class, for example.

```
public abstract class KeySetProviderBase
{
    /// <summary>
    /// Initialize the keyset caches.
    /// This is called immediately after the default constructor.
    /// </summary>
    /// <param name="manager"></param>
    public abstract void LoadKeySets ( KeySetManager manager);
    /// <summary>
    /// When the keysets need to be refreshed, this is true.
    /// </summary>
    public Boolean ReloadRequired
    {
        get { return _reloadRequired; }
        set { _reloadRequired = value; }
    }
    private Boolean _reloadRequired;
}
```

In this embodiment, the LoadKeySets method can load one or more keysets into memory. These can be created and/or derived from another source, for example. Additionally, the ReloadRequired can indicate when the keys should be refreshed to ensure integrity of the keys and mitigate the chance of compromise. Sharing keys amongst a plurality of application server components 302 can be implemented by providing a locking mechanism such that one resource at a time can access a given keyset or the totality of keysets (such as keyset manager 502 or application server component 302, for example). In one embodiment, the keyset manager 502 can implement one or more queues relating to each key in the secure envelope keyset component 504 and the authenticated session keyset component 506; the queues can be utilized to indicate a number of entities accessing the keys. If the number goes above a maximum, the queue can deny access until a key reference is released. This can be implemented using semaphore logic, for example. If no keysets are available (e.g. substantially all queues are full), the querying thread can block until it receives its key (and/or implement a callback functionality, for example). It is to be appreciated that the encryption and decryption keys can be kept separate and can, indeed, have different queues and queue lengths. Additionally, the queues can be auto-tuning such to use inference or other technologies to grow the size of the queue (such as based on demand) without exceeding a specified maximum, for example. In one embodiment, the keys can be wrapped upon accessing in a self-contained class such that upon dispose by the querying thread, the instance state can be disposed of and the key returned back to its appropriate keyset component (secure envelope keyset component 504 and/or authenticated session keyset component 506).

It is to be appreciated that the keyset managers 502 can have substantially the same keyset contents. To this end, when an application server component 302 loads its keysets, a static member can be passed for the application server component 302 so that appropriate methods can be called. For example, such methods for the secure envelope keyset component 504 can be substantially implemented using the following functional signatures.

```
public void AddSecureEnvelopeEncryptorQueue( Int16 keyId,
    Queue<KeySetBase> queue);
public void AddSecureEnvelopeDecryptorQueue( Int16 keyId,
    Queue<KeySetBase> queue);
```

The authenticated session keyset component 506 can implement similar functions using the following functional signatures, for example.

```
Authenticated Session Methods:
public void AddAuthenticatedSessionActiveQueue(Int16 keyId,
    Queue<KeySetBase> queue);
public void AddAuthenticatedSessionExpiredQueue(Int16 keyId,
    Queue<KeySetBase> queue);
```

An example of a keyset manager 502 that generates new keysets can be implemented using the following pseudo-code, for example.

```
public override void LoadKeySets(KeySetManager manager)
{
    String hmacKeyAlgorithmName;
    byte[ ] hmacKeyMaterial;
    Int16 keyId = 0;
    Queue<KeySetBase> keySetQueue;
    int decryptQueueLength = KeyManager.DecryptQueueLength;
    int encryptQueueLength = KeyManager.EncryptQueueLength;
    Random rand = new Random( );
    RNGCryptoServiceProvider Gen = new RNGCryptoServiceProvider( );
    // add 10 keysets
    for(int i = 0; i < 10; i++)
    {
        keyId = rand.Next(Int16.MaxValue);
        hmacKeyAlgorithmName = CryptoConfig.HmacAlgorithmName;
        hmacKeyMaterial = new byte[256 / 8]; // 256-bit key
        Gen.GetBytes(hmacKeyMaterial);
        //
        // Add key material as an inactive keyset
        //
        keySetQueue = new Queue<KeySetBase>( );
        for (int i = 0; i < decryptQueueLength; i++)
        {
            keySetQueue.Enqueue(
                new AuthenticatedSessionKeySet(
                    keyId,
                    hmacKeyAlgorithmName,
                    hmacKeyMaterial));
        }
        manager.AddAuthenticatedSessionExpiredQueue(
            keyId,
            keySetQueue);
        //
        // Add same key material as an Active keyset
        //
        keySetQueue = new Queue<KeySetBase>( );
        for (int i = 0; i < encryptQueueLength; i++)
        {
            keySetQueue.Enqueue(
                new AuthenticatedSessionKeySet(
                    keyId,
                    hmacKeyAlgorithmName,
                    hmacKeyMaterial));
        }
        manager.AddAuthenticatedSessionActiveQueue(
            keyId,
            keySetQueue);
    }
}
```

It is to be appreciated that the foregoing pseudo-code is just one example of possible implementations; in fact, the pseudo-code does not provide for moving keysets into inactive queues as described in other embodiments herein.

In one embodiment, the keys can be implemented as one or more files that can be shared among a plurality of application server components 302, for example. In this regard, files and directories can be monitored for changes and lazily updated to the application server components 302 to effectuate key rotation. In this embodiment, the secure envelope keyset component 504 can have a file format corresponding to the following extensible markup language (XML) representation.

```
<secureEnvelopeKeySets version="1">
    <keyset id="20012" expired="false" format="base64">
        <symmetricKey
algName="AES256">
DYMWaQ1J9uW1YgDbuzS/OEB6n3r8AeISNnYsUb/NoiU=
        </symmetricKey>
        <hmacKey
algName="HMACSHA1">1xbyGu0LWh47QQG+
B4Ryy/l2VTetqLxUdzKfOvaiUOU=
        </hmacKey>
    </keyset>
    <keyset id="9314" expired="true" format="base64">
        <symmetricKey
algName="AES256">
VdoFHdmOw2B8a/CosrQrHpxoHa02tLoMun6KCRhlZhc=
        </symmetricKey>
        <hmacKey
algName="HMACSHA1">
9wudS8cdoEL5lsVEVnfnJFoW5Lnl94gfWL+rJdtPNso=
        </hmacKey>
    </keyset>
</secureEnvelopeKeySets>
```

Thus, the secured envelop keyset component 504 can also provide message authentication code keysets in addition to the symmetric keys to facilitate stronger authentication of the initial messages that utilize the secure envelope keysets. Additionally, the authenticated session keyset component 506 can have the following file format.

```
<authSessionKeySets version="1">
    <keyset id="789" expired="false" format="base64">
        <hmacKey
algName="HMACSHA1">XN9c8g8b/V+qGtL+
EwOimVGkxWPGMMuD6T0UII/4lTo=
        </hmacKey>
    </keyset>
    <keyset id="5678" expired="true" format="base64">
        <hmacKey
algName="HMACSHA1">
KvK/sPPUzKnF/abDBT6X2dkBBZ1Ste8a4bmts5YjVt0=
        </hmacKey>
    </keyset>
</authSessionKeySets>
```

The keyset components 504 and 506 of the various application server components 302, then, can monitor files for changes and parse the files, such as according to the foregoing formats for example, to load key information for subsequent use. When the keysets rotate into different life states (such as from active to inactive and/or inactive to expired), the application server components 302 can be required to re-authenticate (or re-bootstrap) with respect to requesting entities to facilitate increasing security. Additionally, keys can be kept in the keyset manager component 502, and a key id can be persisted to the requesting entity such that the key cannot be realized (and therefore not tampered with) by way of communication between the requesting entity and the application server component 302. Rather, in this embodiment, the key id can be used in communication with the requesting entity, and the appropriate key is gathered and sent with the request from the application server component 302 to the platform component 106, for example.

Moreover, the keyset components 504 and 506 can comprise a database (such as a relational database and/or other types including, but not limited to, flat-files, comma-separated value files, XML files, other hierarchical formats, and the like) that stores the keys (such as according to key id, for example). In this regard, the key information can be kept in the database, such as the id, the key material, expiration date, status, etc. Additionally, the status can be represented as different tables in the database, such as tables for each of active, inactive, and/or pre-active, for example. In one embodiment, a keyset table can be created using the following relational database pseudo-code.

```
CREATE TABLE keysets
(
    key_id SMALLINT NOT NULL,
    key_material xml NOT NULL,
    date_issued datetime NOT NULL,
    date_expires datetime NOT NULL
    constraint pk_keysets primary key (key_id)
);
```

In this example, the key_material field holds information describing the keyset itself along with type if applicable, for example. The key_id can be used to identify the keyset and utilized in communication with a requesting entity (such as through a token, for example). Furthermore, the table can be populated by using the following relational database pseudo-code, for example, relating to the secure envelop keysets (such as those stored in the secure envelop keyset component 504, for example).

```
DECLARE @InsertKeySetExpire nvarchar(1000);
SET @InsertKeySetExpire =
    N'if not exists
    (
        select key_id from keysets
        where
            key_id = @key_id
    )
    BEGIN
    insert keysets
    (
        key_id,
        key_material,
        date_issued,
        date_expires
    )
    values
    (
        @key_id,
        @key_material,
        @date_issued,
        @date_expires
    )
    END';
DECLARE @KeySetParamDefinition nvarchar(500);
SET @KeySetParamDefinition = N'@key_id smallint, @key_material xml,
    @date_issued datetime, @date_expires datetime'
declare @date_issued_0 datetime
set @date_issued_0 = dateadd(day, 0, getutcdate( ))
declare @date_expires_1 datetime
set @date_expires_1 = dateadd(day, 1, getutcdate( ))
EXECUTE sp_executesql @InsertKeySetExpire, @KeySetParamDefinition,
    @key_id = 1,
```

-continued

```
    @key_material = '<secureEnvelopeKeySet><symmetricKey
algName="AES256">+
MQqMP3pwkYfDU02M82aVYPIBicNrckY4RxeWFqsVHI=
</symmetricKey><hmacKey algName=
"HMACSHA1">id0F0Ybqo6lTjPfN0Y6sPF2Ex6LbII+KX9
xnVfgmMNM=</hmacKey></secureEnvelopeKeySet>',
    @date_issued = @date_issued_0,
    @date_expires = @date_expires_1
```

This inserts the key information into a table relating to a secure envelop keyset, for example. It is to be appreciated that the foregoing pseudo-code represents but one of many possible implementations of the associated keyset components as described herein, and the subject matter as described is not limited to only these implementations.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent, for instance by inferring actions based on contextual information. By way of example and not limitation, such mechanism can be employed with respect to generation of materialized views and the like.

In view of the exemplary systems described supra, methodologies that may be implemented in accordance with the disclosed subject matter will be better appreciated with reference to the flow charts of FIGS. 6-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 6:
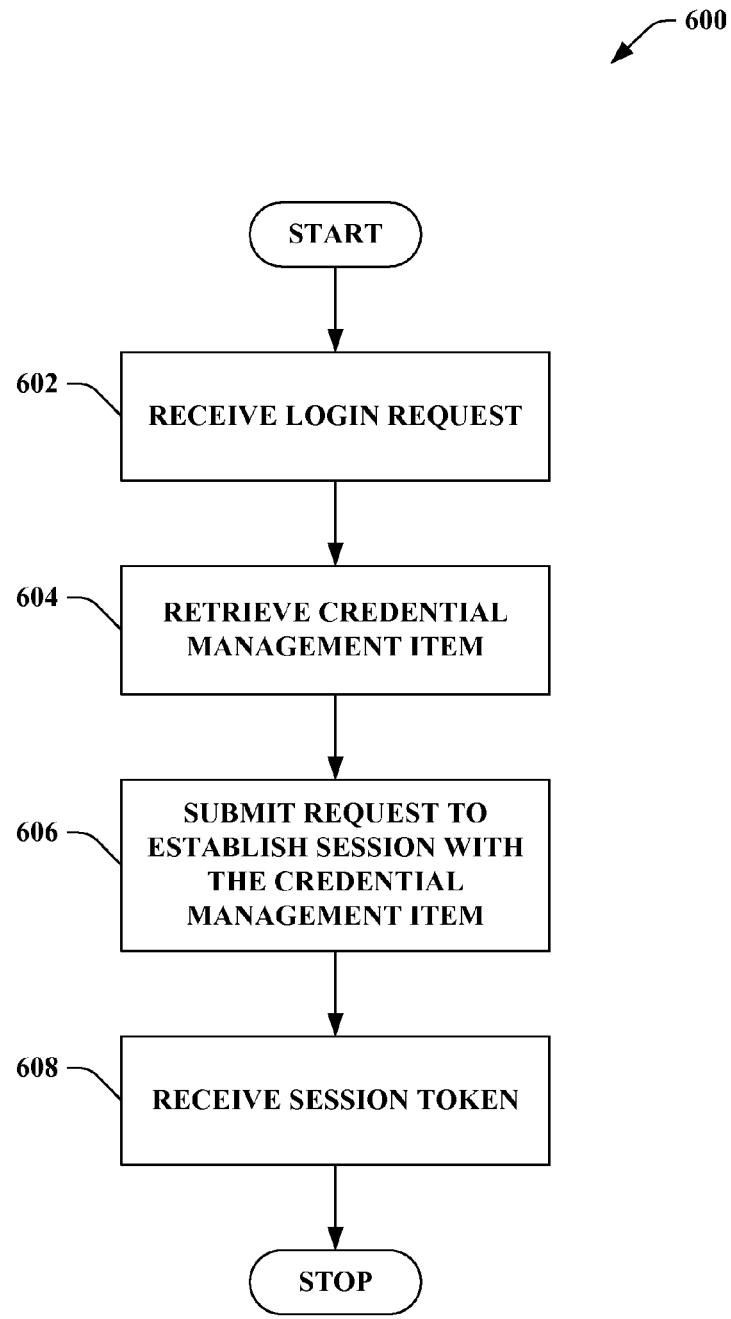
FIG. 6 illustrates an exemplary flow chart for bootstrapping a session with a platform using a credential management provider.

FIG. 6 shows a methodology 600 for bootstrapping an authenticated session. At 602, a login request is received from a requesting entity, such as a user for example. The login can relate to a login on a platform, for example, that houses desired data where the login request is made to an entity that facilitates accessing the platform and/or data stored therein. At 604, a credential management item related to the login request is retrieved. For example, this can be a passport style credential management item where authentication is outsourced to a third-party service, for example. In this regard, the platform can assign a level of trust related to the third-party nature of the service where the level of trust can allow different access as compared to other types of accessing application configurations, devices, users, and/or the like. The credential management item can be accessible by the entity that can access the platform and/or the platform itself, for example. In this regard, the entity accessing the platform can allow a requesting entity to select a credential management item (such as from a list and/or by acquiring login information, for example) and allow the platform to validate information from the credential management item against platform data without having to transmit authorization information. Rather, the platform can acquire the necessary information directly from a third-party service (e.g. a passport service) putting the responsibility of authorization maintenance on the third-party service, for example.

At 606, a request to establish a session is sent, such as to the platform, along with the credential management item. In this regard, the credential management item can be the item itself, such as a platform, and/or information on where to retrieve the credential management item or additional information concerning such, for example. Thus, the platform can obtain information such as a token or other indication of authorization from a third-party service responsible for the credential management item, etc. Using this information, the platform, or other entity receiving the request, can determine an authorization of the credential management item and create a session token that indicates the establishment of the session. At 608, the session token can be received by the entity that accesses the platform and provided to the platform in subsequent requests. As described previously, the session token can comprise information regarding the entity accessing the platform, a user utilizing the accessing entity, a shared secret to utilize for message/request verification, and the like. As described previously, the session token can expire requiring re-bootstrapping of the accessing entity and an associated user, for example.

Figure 7:
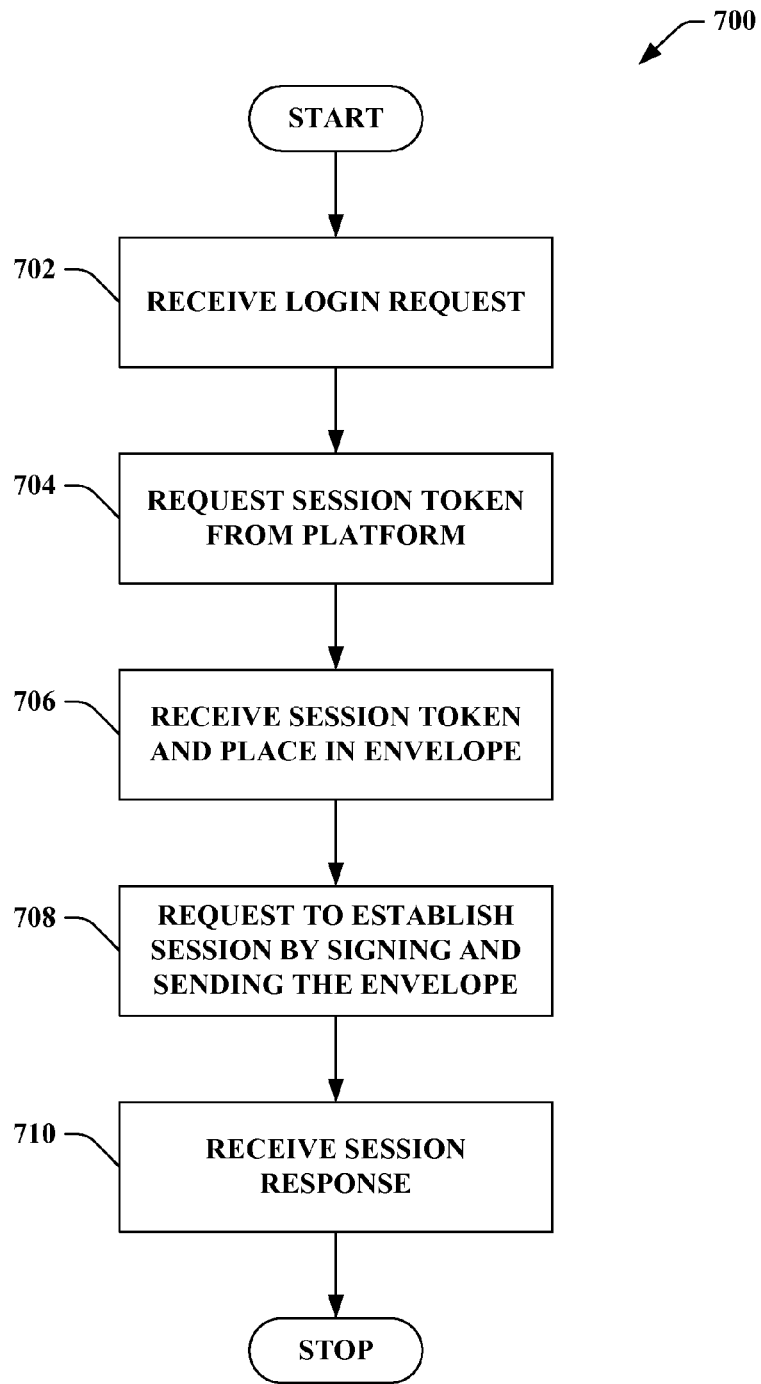
FIG. 7 illustrates an exemplary flow chart for bootstrapping a session with a platform in an application server configuration.

FIG. 7 illustrates a methodology 700 that facilitates bootstrapping a session for an application server or a similar trusted configuration with a platform or other data source. At 702, a login request is received from a requesting entity, such as a user or application, to an entity, such as an application server, that can access a platform or other data store or interface coupled to a platform/data store, for example. In one embodiment, the platform/data store can expose methods and/or data as callable methods, such as web methods (e.g. web services). The login request can comprise credentials related to the platform/data store such as a username, password, and/or the like, to authorize the requesting entity (and/ or the accessing entity, such as an application server) with respect to the platform/data store. At 704, the application server, or similar entity, can request a session token from the platform or an intermediary, for example, by supplying the credentials received from the requesting entity. The request, in this embodiment, can be accompanied by a MAC algorithm or a shared secret for subsequent requests, for example.

At 706, the session token can be received and placed into an envelope, such as for submission to a platform, for example. The session token can comprise information relevant to the platform for use in authenticating/authorizing an application server and/or requesting entity in subsequent requests. Part of the information can be, for example, the MAC algorithm or shared secret provided in the request for the credential token, for example. In this regard, the platform need not keep information regarding application server(s) to verify communication; rather, the session token can be passed in subsequent requests to provide information regarding ensuring the integrity of data sent in the requests. For example, the MAC algorithm and/or shared secret can be extracted from the session token by the platform upon a request for data and applied to the request to compare with a MAC sent with the message to ensure the data was not tampered with en-route. At 708, the envelope can be signed and sent as a request to establish a session. This can be performed with respect to a platform or other service that exposes one or more methods (e.g. to access data), such as a web method, for example. The platform can decrypt the envelope; this can be done in a number of ways, for example extracting the token to determine an application identifier and matching such with a public decryption key. The platform can determine a result for the session establishment request and such can be received by the accessing entity or application server at 710.

Figure 8:
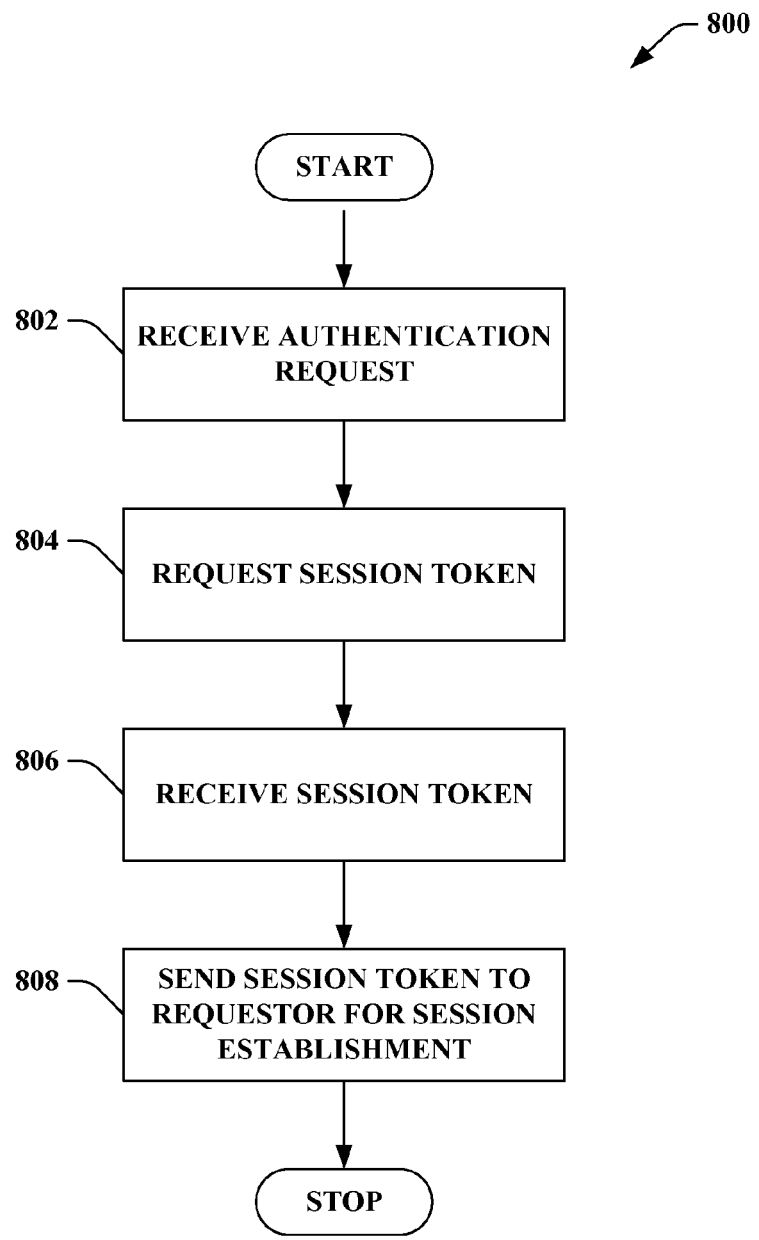
FIG. 8 illustrates an exemplary flow chart for utilizing a third-party authentication layer in conjunction with bootstrapping a session with a platform.

FIG. 8 shows a methodology 800 for receiving and forwarding a request for session establishment as a control layer to mitigate direct connecting with a provider of data/web methods related to a data platform. For example, the layer can provide increased security by acting as a first layer of security. At 802, an authentication request is received. The request can come from an application, such as an application server and/ or thick-client application requesting access to a platform, for example. Determinations can be made regarding the status of the requesting application, for example, and at 804, a session token can be requested, such as from the platform. It is to be appreciated that the additionally determined information can be provided to the platform as well. At 806, a session token can be received, such as from the platform. The session token can comprise information regarding the requesting entity, for example, thus providing a mechanism to hold state information in a substantially stateless configuration. In this regard, the information in the token can be essentially opaque to the application server and/or requesting entity. For example, the token can comprise information regarding MACs and/or keys used to verify/decrypt messages. At 808, the session token can be sent to the original requester, such as an application and/or a requesting entity of such. Using the session token, the application can establish a session with a platform, for example, in a subsequent request.

Figure 9:
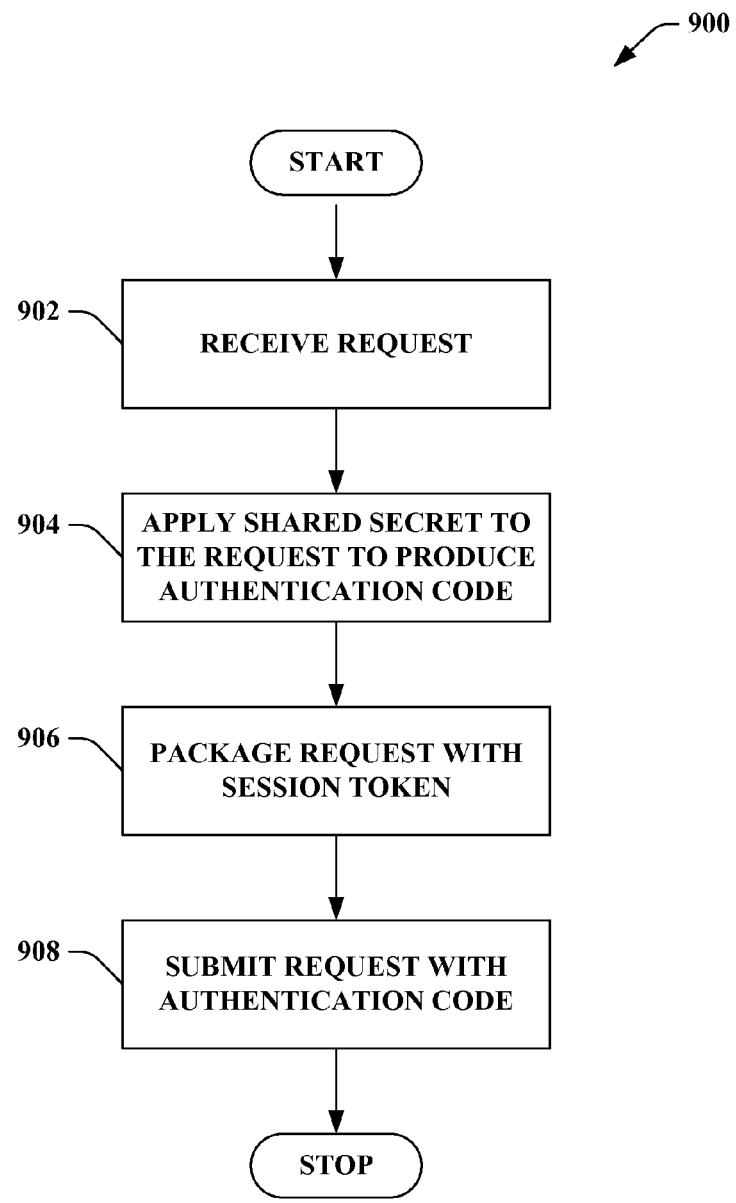
FIG. 9 illustrates an exemplary flow chart for applying an authentication code to a request for accessing to one or more web methods.

FIG. 9 displays a methodology 900 for submitting a request for data for which authentication is required following an initial bootstrapping sequence. At 902, a request for data can be received by an entity, such as an application server and/or a thick-client application, where the request relates to accessing data from a platform or data store. As indicated, an initial bootstrapping sequence can already have occurred between the entity specifying the request, the application that is responding to the request and the platform/data store. The result of the bootstrapping can have been a session token. At 904, a shared secret is applied to the request to produce a authentication code, such as a MAC/HMAC to subsequently ensure the integrity of the request. In one embodiment, the session token can comprise the shared secret and/or authentication code algorithm such that a receiver of the request (e.g. the platform/data store) can apply the shared secret with the algorithm to the message and compare the result to the resulting authentication code result sent with the request. At 906, the session token can be packaged with the request to facilitate this functionality, for example. As described, the platform or receiving entity can extract the shared secret and/or authentication code algorithm from the request; in this regard, no information regarding authentication coding used by requesting entities need be kept by the platform as the information can be sent with the request (in the token, for example). At 908, the request can be submitted with the resulting authentication code to facilitate the foregoing functionality, successfully requesting desired information.

Figure 10:
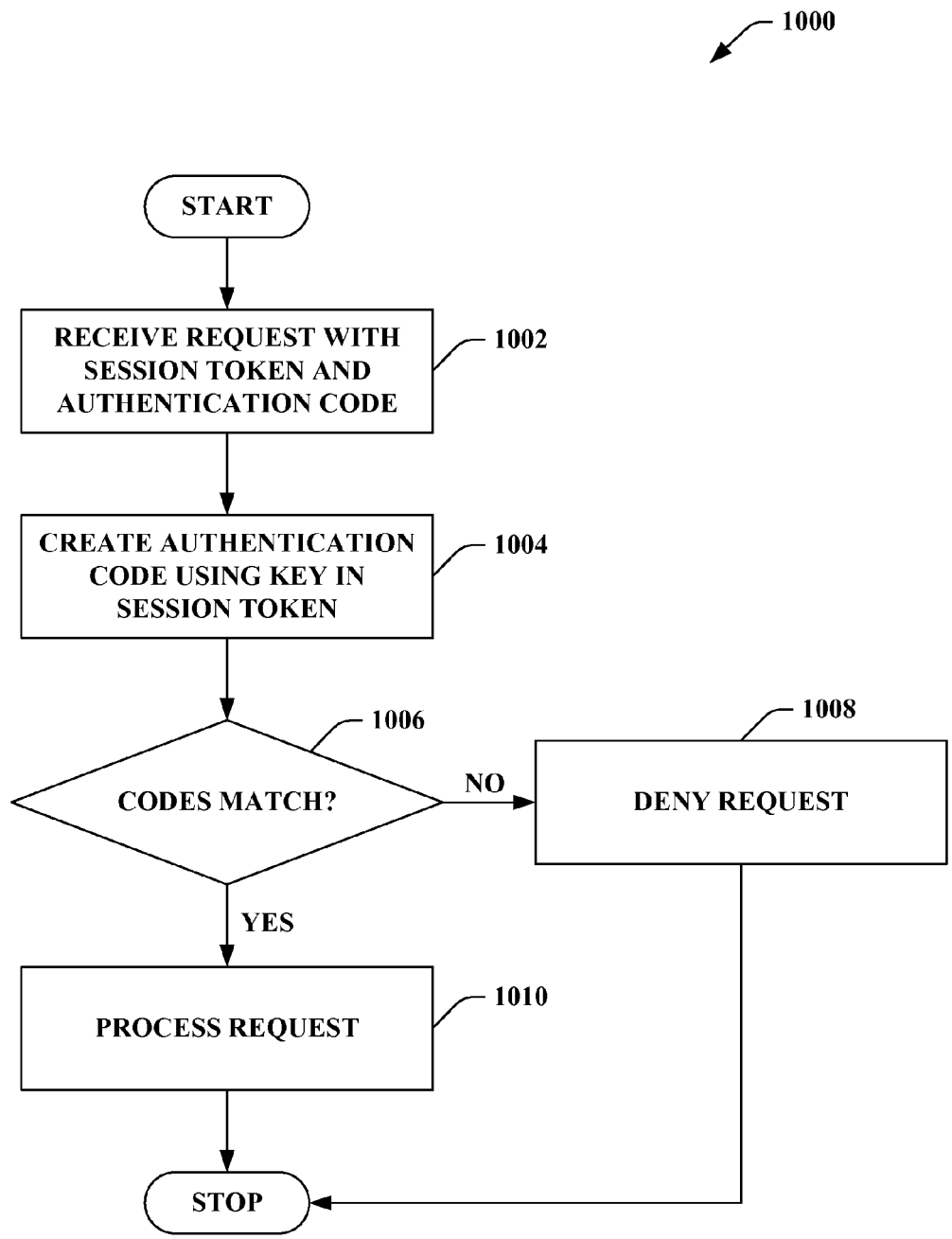
FIG. 10 illustrates an exemplary flow chart for verifying integrity of a request for one or more web methods in a platform.

FIG. 10 illustrates a methodology 1000 for ensuring integrity of a message received from a requesting entity. The message can relate to a request for data and authentication can be required, for example, along with an assurance of valid data. At 1002, a request is received along with a session token and an applied authentication code. The request can be for data housed within a platform, for example, and/or a method to access such data. The session token can indicate information established during a bootstrapping authentication sequence, for example, and can be opaque to the requesting entity. The platform, however, can analyze the token to determine a user, application, and/or an authentication code key or algorithm for the request. At 1004, the platform or receiving entity of the request can create an authentication code for the request using key or algorithm. In this regard, the platform can determine if the request was tampered with en-route or not. By placing the algorithm/key in the token, the platform need not keep information regarding such as the requesting entity can blindly send the key/algorithm in the request, thus adding state to a substantially stateless configuration, for example.

At 1006, the codes are compared to see if they match. The codes can be the code provided with the request that represents the result of an application of the authentication key or algorithm to the message prior to sending and the code applied by the platform upon receiving the message. If the codes do not match, this can indicate tampering with the message and the request can be denied at 1008. It is to be appreciated that additional or different actions can be taken in this regard, such as logging, or additional authentication, etc. If the codes match, the request can be further processed at 1010. Again, it is to be appreciated that other/additional actions can be taken. For example, further authentication/authorization can be performed with respect to other aspects of the request and/or token. Moreover, use of the authentication codes, as described, can be more efficient than encrypting/decrypting each request method. Additionally, it can be less secure and therefore reserved for more trusted configurations, such as application server configurations, for example.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 11:
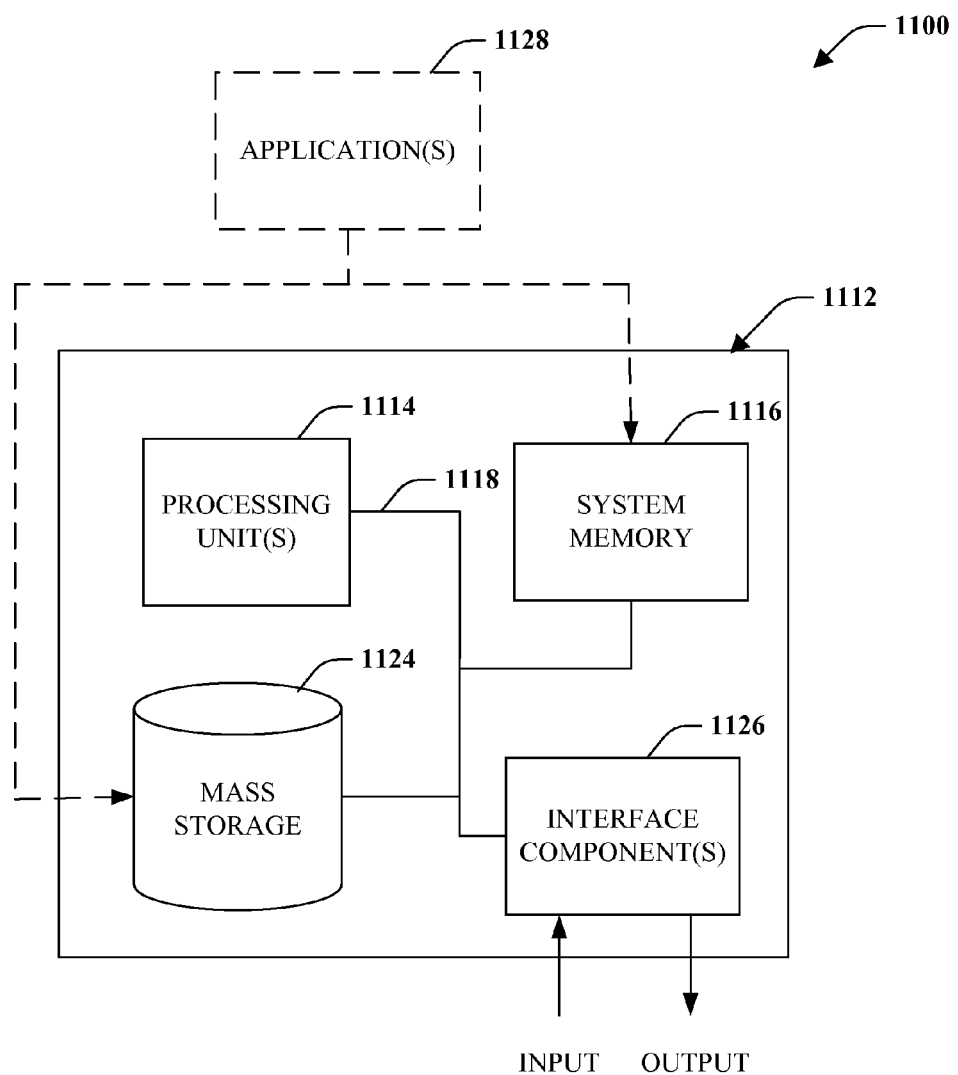
FIG. 11 is a schematic block diagram illustrating a suitable operating environment.
Figure 12:
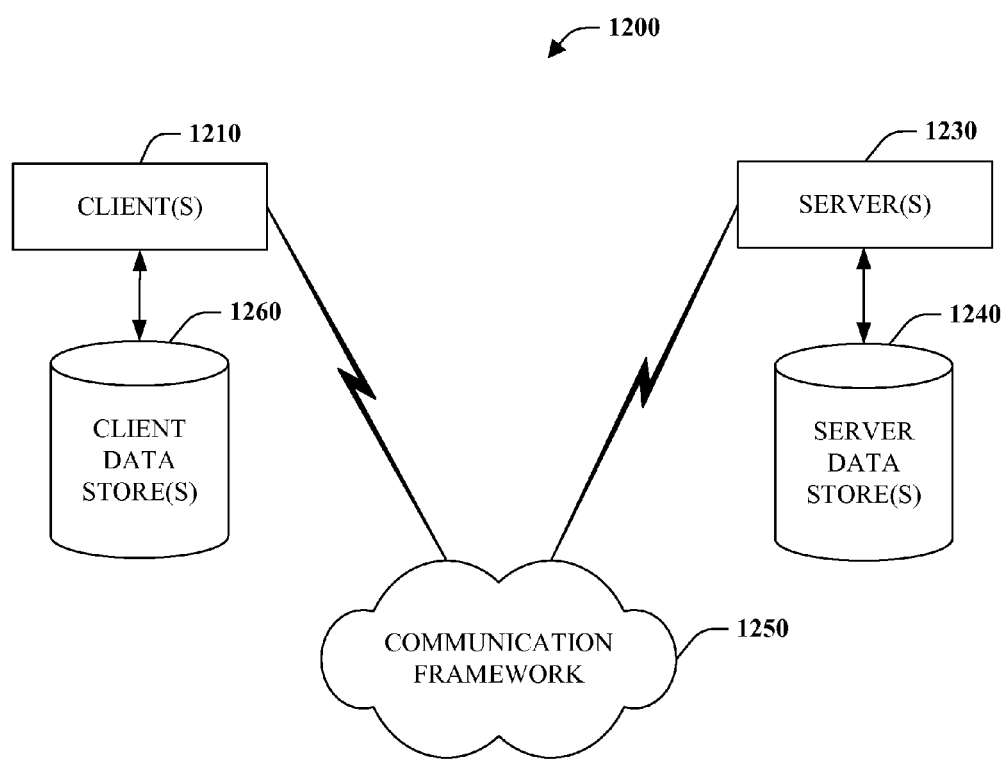
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 11, an exemplary environment 1100 for implementing various aspects disclosed herein includes a computer 1112 (e.g., desktop, laptop, server, hand held, programmable consumer or industrial electronics . . . ). The computer 1112 includes a processing unit 1114, a system memory 1116 and a system bus 1118. The system bus 1118 couples system components including, but not limited to, the system memory 1116 to the processing unit 1114. The processing unit 1114 can be any of various available microprocessors. It is to be appreciated that dual microprocessors, multi-core and other multiprocessor architectures can be employed as the processing unit 1114.

The system memory 1116 includes volatile and nonvolatile memory. The basic input/output system (BIOS), containing the basic routines to transfer information between elements within the computer 1112, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1112 also includes removable/non-removable, volatile/non-volatile computer storage media. FIG. 11 illustrates, for example, mass storage 1124. Mass storage 1124 includes, but is not limited to, devices like a magnetic or optical disk drive, floppy disk drive, flash memory or memory stick. In addition, mass storage 1124 can include storage media separately or in combination with other storage media.

FIG. 11 provides software application(s) 1128 that act as an intermediary between users and/or other computers and the basic computer resources described in suitable operating environment 1100. Such software application(s) 1128 include one or both of system and application software. System software can include an operating system, which can be stored on mass storage 1124, that acts to control and allocate resources of the computer system 1112. Application software takes advantage of the management of resources by system software through program modules and data stored on either or both of system memory 1116 and mass storage 1124.

The computer 1112 also includes one or more interface components 1126 that are communicatively coupled to the bus 1118 and facilitate interaction with the computer 1112. By way of example, the interface component 1126 can be a port (e.g., serial, parallel, PCMCIA, USB, FireWire . . . ) or an interface card (e.g., sound, video, network . . . ) or the like. The interface component 1126 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1112 to output device(s) via interface component 1126. Output devices can include displays (e.g., CRT, LCD, plasma . . . ), speakers, printers and other computers, among other things.

FIG. 12 is a schematic block diagram of a sample-computing environment 1200 with which the subject innovation can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the aspects of the subject innovation, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. Here, the client(s) 1210 can correspond to program application components and the server(s) 1230 can provide the functionality of the interface and optionally the storage system, as previously described. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

By way of example, one or more clients 1210 can be operated by a user desiring access to one or more servers 1230 and/or associated information in one or more server data stores 1240. A request can be made via the communication framework 1250 for the data, where the request can supply a session token, from a previously established session (e.g. through a bootstrapping procedure), comprising data regarding the user and/or client(s) 1210. Additionally, the request can have an applied message code sent along, and the server (s) 1230 can apply a code from the token to the received message and compare the results to determine integrity of the request data, for example. After ensuring the data integrity, authentication and/or authorization can be verified for the request, and data from the server data store(s) 1240 can be sent back to the client(s) 1210 from the server(s) 1230 over the communication framework 1250. Additionally, the client (s) 1210 can store the data in one or more local client data store(s) 1260, for example.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A computer-implemented system configured to authenticate one or more clients on a web method platform, the computer-implemented system comprising:
    a processor;
    a platform component configured to allow authenticated access to one or more web methods by a plurality of clients;
    a unified session authentication component configured to bootstrap an authenticated session unique to a type of client and utilize a subsequent mechanism to facilitate accessing the web methods, wherein the subsequent mechanism is common to the plurality of clients;
    a trust-tier determination component configured to assign a trust-tier level to one or more of the plurality of clients and control access to the web methods based, at least, in part, on the trust-tier level, wherein the trust-tier level is assigned based, at least, in part, on a type of device using one or more of the plurality of the clients, wherein at least one of the plurality of clients is an application server in a farm of application servers and one or more of the application servers comprise a keyset manager synchronized between the farm of application servers to ensure validity of shared secrets and private keys; and
    a computer-readable storage medium storing instructions that, when executed by the processor, cause the processor to implement at least one of the platform component, the unified session authentication component or the trust-tier determination component.

2. The computer-implemented system of claim 1, wherein the trust-tier level is further assigned based, at least, in part on information gathered during bootstrapping of the authenticated session.

3. The computer-implemented system of claim 1, further comprising a token creation component configured to generate a token during bootstrapping of the authenticated session, wherein the token comprises information about the client and is transmitted with subsequent requests to access the web methods.

4. The computer-implemented system of claim 3, wherein the token is opaque to the client.

5. The computer-implemented system of claim 3, wherein the token comprises a shared secret configured to be applied by the unified session authentication component to a subsequent request and compared to an application of the shared secret by the client that is transmitted with the subsequent request to ensure integrity of the subsequent request.

6. The computer-implemented system of claim 1, wherein at the application server facilitates accessing one or more of the web methods based on a request related to a user, and wherein credentials related to the user are specified during bootstrapping of the authenticated session.

7. The computer-implemented system of claim 6, wherein the private keys are configured to protect the bootstrapping of the authenticated session and subsequent requests for the web methods.

8. A computer-implemented method to provide one or more application servers authenticated access to platform data, the computer-implemented method comprising:
   executing on a processor, instructions that, when executed, perform a method comprising:
      receiving credentials related to a user of an application server and a message authentication code key related to the application server;
      generating a token for subsequent requests, wherein the token includes the message authentication code key;
      sending the token to the application server as part of a bootstrapping procedure; and
      assigning a trust-tier level to the application server, wherein the trust-tier level is assigned based, at least, in part, on the application server and a device accessing the application server, and wherein the application server functions in a farm of application servers and one or more of the application servers comprise a keyset manager synchronized between the farm of application servers to ensure validity of shared secrets and private keys.

9. The computer-implemented method of claim 8, further comprising receiving a request to establish a session, wherein the request includes the token, and wherein the request is signed by the application server using a private key.

10. The computer-implemented method of claim 9, further comprising:
   decrypting the request using a public key associated with the application server; and
   sending an authentication status to the application server.

11. The computer-implemented method of claim 10, further comprising receiving a request from the application server for access to one or more exposed web methods, wherein the request includes the token.

12. The computer-implemented method of claim 11, further comprising:
   retrieving the message authentication code key from the token;
   applying the message authentication code key to the request; and
   comparing a result to a message authentication code transmitted with the request to ensure integrity of the request.

13. The computer-implemented method of claim 8, further comprising regulating access to requests from the application server based, at least, in part, on an assigned trust-tier level.

14. The computer-implemented method of claim 8, wherein the trust-tier level is further assigned based, at least, in part on a specified user of the application server.

15. The computer-implemented method of claim 8, wherein the credentials are received from a partner authentication server.

16. A computer-readable storage medium, where the medium is not a signal, storing computer-executable instructions that, when executed by a computing device, cause the computing device to perform operations comprising:
   bootstrapping an authenticated session request with one or more disparate clients to provide subsequent access to one or more exposed web methods; and
   assigning a trust-tier level to the one or more disparate clients based, at least, in part on the bootstrapping and a device by which the one or more disparate clients access the one or more exposed web methods, wherein access to the one or more web methods is controlled based, at least, in part on the trust-tier level, wherein at least one of the disparate clients is an application server in a farm of application servers and one or more of the application servers comprise a keyset manager synchronized between the farm of application servers to ensure validity of shared secrets and private keys.

17. The computer-readable storage medium of claim 16, the operations further comprising providing a homogeneous mechanism to the one or more disparate clients to request access to the one or more web methods following the bootstrapping of the authenticated session.

\* \* \* \* \*